(No Model.)

C. I. KANE.
WARP STOP MOTION FOR LOOMS.

No. 446,100. Patented Feb. 10, 1891.

Witnesses:
D. H. Haywood
C. L. Sundgren

Inventor:
Charles I. Kane
by his attorneys
Brown & Griswold

UNITED STATES PATENT OFFICE.

CHARLES I. KANE, OF NEW YORK, N. Y., ASSIGNOR TO ALONZO L. KANE, OF MILWAUKEE, WISCONSIN.

WARP STOP-MOTION FOR LOOMS.

SPECIFICATION forming part of Letters Patent No. 446,100, dated February 10, 1891.

Application filed February 28, 1890. Serial No. 342,179. (No model.)

*To all whom it may concern:*

Be it known that I, CHARLES I. KANE, of the city and county of New York, in the State of New York, have invented a certain new and useful Improvement in Warp Stop-Motions for Looms, of which the following is a specification.

My improvement relates more particularly to so-called "narrow looms," and is designed to effect the stoppage of a loom upon the breaking of a warp end.

I will describe my improvement in detail, and then point out the novel features in claim.

Figure 1:
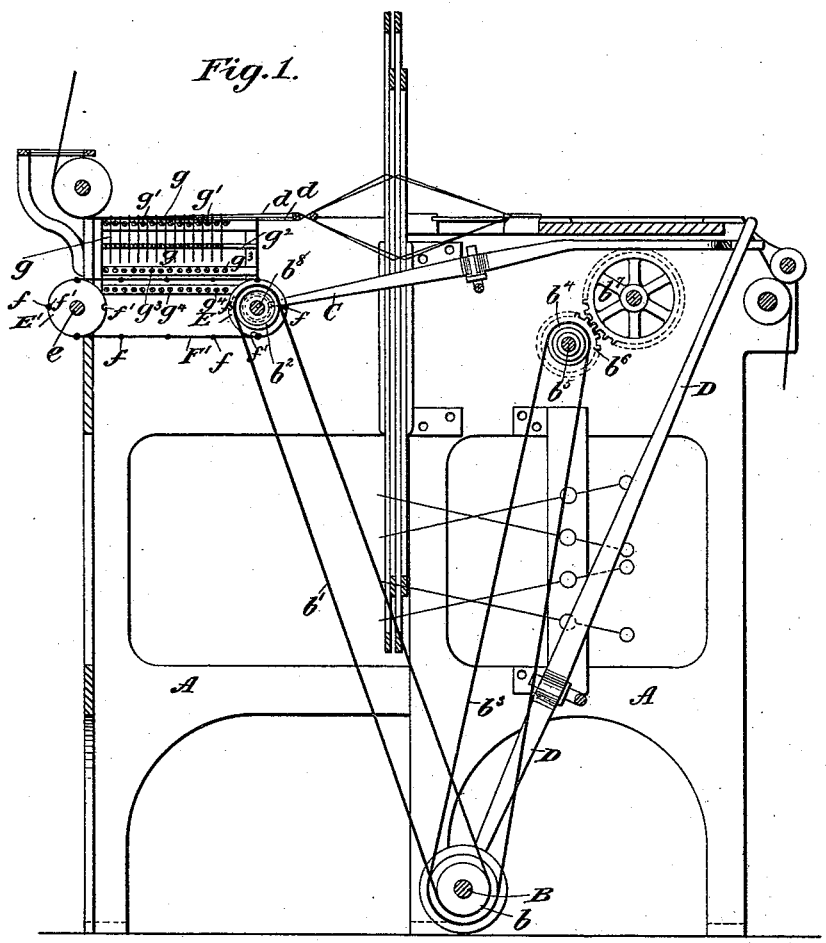
Figure 2:
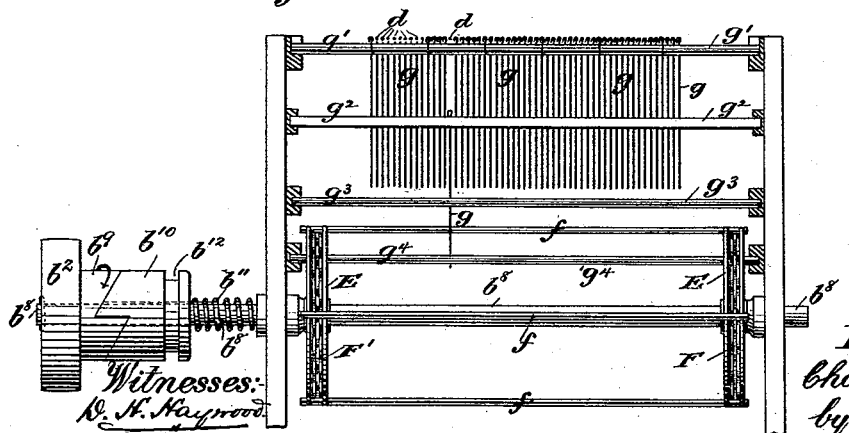

In the accompanying drawings, Figure 1 is a vertical section of a loom embodying my improvement. Fig. 2 is a detail of certain of the stop mechanism, looking at the end thereof, and on an enlarged scale.

Similar letters of reference designate corresponding parts in both figures.

I have only illustrated and will describe such portions of a loom as are essential to an understanding of my improvement.

A designates a portion of a loom-frame, and B the main or driving shaft. Upon the driving-shaft B, I have shown a pulley $b$, from which a belt $b'$ transmits motion to a pulley $b^2$. A belt $b^3$ transmits motion from the pulley $b$ to a pulley $b^4$, mounted upon a shaft $b^5$, upon which is a gear-wheel $b^6$, meshing with another gear-wheel $b^7$, and from which the lay and shuttle motions (not shown) are operated. The pulley $b^2$ is loosely mounted upon a shaft $b^8$, journaled in the frame of the machine. Upon one side of this pulley is a ragged or toothed hub $b^9$. This toothed hub forms one member of a friction-clutch, the other member of which $b^{10}$ is loosely mounted upon the shaft $b^8$, but has a feathered connection therewith, so that it may slide freely on the shaft, but will rotate with the shaft. The members $b^9$ $b^{10}$ of the clutch are normally held in close contact with each other by means of a coil-spring $b^{11}$, surrounding the shaft $b^8$ and abutting near one of its ends against the member $b^{10}$ and at its other end against one of the bearings for the shaft. When the member $b^{10}$ is moved lengthwise upon the shaft $b^8$, it is so moved against the resistance offered by the spring $b^{11}$. The member $b^{10}$ is provided with a peripherical groove $b^{12}$. Into this groove extends one end of a lever C, which lever is fulcrumed upon the frame of the machine. The other end of the lever bears against the upper end of a shipper-lever D, also fulcrumed upon the frame of the machine. The lower end portion of the shipper-lever D may engage one member of a clutch, (not shown in the drawings,) or it may be provided with belt-shippers to operate upon the belts $b'$ $b^3$, as desired, in order to stop the transmission of motion from the shaft B to the pulley $b^2$ or pulley $b^4$. When the member $b^{10}$ of the clutch is moved lengthwise of the shaft $b^8$ against the resistance of the spring $b^{11}$, it will cause the lever C to be rocked upon its fulcrum. The lever C will then in turn cause the lever D to be rocked upon its fulcrum, the result being to disengage the clutch upon the shaft B or ship the belts $b'$ $b^3$ to stop the machine.

The stopping of the machine will be effected automatically upon the breaking of any of the warp ends $d$. This is effected in the following manner: Upon the shaft $b^8$ are mounted peripherically-grooved wheels E. Upon a shaft $e$, parallel with the shaft $b^8$, and also journaled in the frame of the machine, are similar wheels E'. In the peripherical grooves of these wheels travel endless chains F F'. These chains are united by cross-bars or slats $f$, secured near their ends to the chains. The cross bars or slats $f$ are so spaced that when the chains are passing about the wheels E E' the end portions of the cross bars or slats will extend into notches $f'$, with which the peripheries of the wheels E E' are provided. When, therefore, rotary motion is imparted to the shaft $b^8$, the endless chains F F', together with the cross bars or slats $f$, will be caused to travel about the wheels E E'. Such travel of the endless chains will continue so long as the member $b^{10}$ of the clutch is maintained in close frictional contact with the member $b^9$ of the clutch. Should the member $b^{10}$ be prevented from rotation, however, the continued rotation of the member $b^9$ in the direction of the arrow shown in Fig. 2 will force the member $b^{10}$ rearwardly upon the shaft $b^8$, thus operating the lever C, as described.

I stop the rotation of the member $b^{10}$ in the following manner: Upon each of the warp ends I hang a wire $g$ by means of a hook with which the upper end of the wire is provided. These wires hang vertically from the warp ends and extend between horizontally-extending guide-rods $g'$ and through suitable perforations in a plate $g^2$. The plate $g^2$ may consist of a piece of ordinary wire-cloth, if desired. Below the plate $g^2$ and the lower ends of the wires $g$ when the latter are supported upon the warp ends are horizontally-extending guide-rods $g^3$. The guide-rods $g^3$ are above the upper traveling part of the endless chains F F' and the cross bars or slats $f$. Below the upper traveling part of the endless chains and cross bars or slats and intermediate of them and the lower traveling part of the endless chains and cross bars or slats are other horizontally-extending guide-rods $g^4$. The guide-rods $g'$, $g^3$, and $g^4$ are arranged directly above each other, so that should a warp end break the wire $g$, which had been supported by it, will drop in a straight line downwardly and between the guide rods $g^3$ $g^4$ into a position in which one of the wires $g$ is shown more clearly in Fig. 2. A too-extended downward movement of the wire $g$ is prevented by the plate $g^2$, through which the hooks on the wires will not pass. When one of the wires has thus dropped, it falls in between two adjacent cross bars or slats $f$ upon the endless traveling chains. As the cross bars or slats are moved along the next one in order will come in contact with the fallen wire, and the latter will thus act as a lock to prevent further movement of the endless chains and the cross bars or slats. This results in stopping the rotation of the shaft $b^8$ and also of the member $b^{10}$ of the clutch. As the member $b^9$ is loose upon the shaft, it will continue to rotate and will force the member $b^{10}$ rearwardly to operate the lever C and stop the machine, as previously described. When the broken warp end has been repaired, the fallen wire is lifted and again engaged with the end. By then shifting the lever D by hand the machine will again be brought into operation.

What I claim as my invention, and desire to secure by Letters Patent, is—

In a stop-motion, the combination of the shaft $b^8$, pulley $b^2$, having a clutch member $b^9$ loose on the shaft, and a member $b^{10}$, having a sliding connection with the shaft, the wheels E E', chains F F', provided with the cross bars or slats $f$, guides $g^3$ $g^4$, wires $g$, and levers C D, substantially as specified.

CHARLES I. KANE.

Witnesses:
FREDK. HAYNES,
C. H. HAYWOOD.